Patented Dec. 10, 1929

1,738,780

UNITED STATES PATENT OFFICE

FRANK S. LOW, OF NIAGARA FALLS, NEW YORK, ASSIGNOR TO THE MATHIESON ALKALI WORKS, INC., OF NEW YORK, N. Y., A CORPORATION OF VIRGINIA

CHROME-GREEN PIGMENT AND ITS MANUFACTURE

No Drawing.    Application filed February 18, 1927. Serial No. 169,410.

This invention relates to improvements in chrome green pigments, and to an improved method of manufacture, and more particularly to the manufacture of a pigment by steaming chromium chloride and to the pigment so produced.

Chrome pigments have been known in the past, as have chrome green pigments, comprising chrome oxide. In all probability the color of any pigment depends upon the amount of light and the kind of light reflected from the pigment, and as a consequence, the physical structure of the pigment itself, as well as its purity, has direct bearing upon the color of the pigment. It naturally follows that by producing a chemical compound, which in the past has been used for coloring purposes, in a purer state and in a different physical condition adapted to reflect more light of the desired color, that pigments, although chemically the equivalent of pigments known in the past, may be produced which, because of their high purity and physical structure, differ materially from the known pigments, and because of their new and desired properties make a most desirable product for pigmentation purposes.

In my co-pending application, Serial No. 37551, filed June 16, 1925, I have disclosed a new method of preparing chromic chloride of an unusually high purity. By oxidizing this chloride I am able to obtain a pigment of unusual depth of color and brilliance. The advantages of such a pigment are at once obvious in that to obtain results similar to those obtained in the past, a less quantity of pigment is necessary, whereas, on the other hand, using the same quantity of pigment as hitherto used, improved results are obtained. The use of such a pigment, therefore, makes for increased efficiency and saving in costs.

Although in its broadest aspects this invention is adapted to treatment of chromic chloride, it is especially adapted to treatment of chromic chloride produced according to the method of my co-pending application above referred to. According to the method there disclosed, chrome ore containing iron is reduced in a suitable furnace to give a compact body of fused material. In this operation practically all of the metals, save the chromium and iron, which are present in the ore, are removed or slagged off. The presence of silicon and carbon in the resulting mass is of no consequence for my present purpose, as they may be volatilized during the subsequent treatment. The alloy thus obtained is chlorinated at a rather high temperature, between 350° or 400° C. and 650° C., but most advantageously at 550° C. This latter temperature is desirable in order that the chromium present may all be converted to the chromic form. The iron forms chlorides which are given off as a vapor at 350° or higher, although in practice 400° C. is a better lower limit. The chromium remains behind as chromic chloride, together with some carbon. Any silicon which may have been present is volatilized as silicon chloride.

The chlorination may take place in any suitable apparatus, a rotary or oscillatory inclined, cylindrical conversion chamber being suitable and well adapted for the carrying out of the process. In using this type of apparatus, the ferrochrome should be comminuted to about 40 mesh. When the chlorine comes into contact with this fine material there is a great development of heat, but the temperature should be so regulated that the resulting chloride is of the chromic form. Chromic chloride decomposes to chromous chloride at temperatures above about 650° C. Above this temperature there may be decomposition and volatilization, but the chromous chloride and chlorine thus formed will recombine on cooling.

On chlorinating the ferrochrome shells off, forming chromic chloride, which is thus produced in a laminated form, the product resembling the laminations of mica. The chromic chloride produced in this manner is not only of high purity, but because of its physical structure is well adapted for the process of this invention, and yields a chromic oxide, which has most desirable properties when used as a pigment.

It is possible that the increased brilliance, etc., of the chromic oxide produced from the chloride manufactured in the manner just described is due to the high purity of the chloride, or possibly it is due to the physical structure of the compound, or on the other hand, it may be due to a combination of these factors and other factors, or due to other factors alone. The fact remains that the product so produced has properties which give it unusual value as a pigment.

The chromic chloride obtained by the process above described, in the form of micaceous laminations, is readily broken down into a fine talc-like powder, and as here used the term "micaceous laminations" means the mica-like plates or the powder produced therefrom.

Chromic cloride when produced by the above desecribed process may be converted into my chrome green pigment by subjecting it to steam at high temperature. This may be done by placing the chloride in a chamber and subjecting it to superheated steam directly, or by replacing the air from the chamber with steam and then applying heat externally and raising the temperature of the contents to a temperature between 300 to 450° C. Although the reaction may be carried out at a higher or lower temperature, this is the preferred range and produces a product of the highest grade. The chloride, when subjected to steam in this manner, is converted to chromic oxide with production of hydrochloric acid as a by-product. The hydrochloric acid may be absorbed and recovered by any suitable means.

After the reaction of the chloride with the steam has been completed, which is indicated by cessation of the production of hydrochloric acid, chromium is present as the oxide, and there may be a small amount of carbon mixed therewith. It has been found advantageous after cutting off the steam in the above process to introduce a stream of oxygen or air or other oxidizing fluid, but preferably oxygen, which causes a violent combustion of the finely divided carbon particles and raises the temperature to a red heat for a brief period. This step serves the double purpose of removing the carbon and insures dehydration of the chromic oxide and appears to materially improve its color.

If the chromic chloride used as the starting point of the oxidation step is free from carbon, the final blowing with the oxidizing gas may be omitted from the above procedure and good results obtained, although if there is no carbon present in the starting product, it may be desirable to add a small amount of finely divided carbon in order to carry out the final violent heating brought about by blowing with air and the subsequent oxidation of the carbon.

If chlorides of lesser purity than that obtained by the process of my co-pending application described above are used, the resulting oxides will be of lesser purity, and the color of the pigment will vary accordingly. It is desirable to use pure chromic chloride as a starting product.

When using chromic chloride such as is produced by the chlorination process above described, a chromic oxide pigment of a peculiar structure and great brilliance is produced. The oxide occurs in micaceous laminations. This oxide is a most desirable product for pigmentation purposes, and whether or not its pigmentation value is due to its physical structure, in that it occurs as laminations, or to its purity, or to other properties or a combination of these properties, may be open to doubt, although it appears that the purity and structure of the compound are prevailing characteristics which tend to give the unusual brightness which I have been able to obtain in this chromic oxide green, and which, so far as I am aware, surpasses pigments of this type hitherto known. Variations in the process and in the structure of the product are possible in so far as they do not deviate from the spirit of the invention, as defined in the following claims.

I claim:

1. Chrome green pigment of micaceous laminated structure obtained by converting micaceous laminated chromic chloride to the oxide.

2. The process of forming chrome green pigment which comprises treating a mixture of chromic chloride and finely divided carbon with steam at 300° to 450° C. and then with oxygen at a temperature that will oxidize the carbon.

3. The process of forming chrome green pigment which comprises treating chromic chloride with steam at 300° to 450° C.

4. The process of forming chrome green pigment which comprises treating micaceous laminated chromic chloride with superheated steam.

5. The process of forming chrome green pigment which comprises treating chromic chloride mixed with finely divided carbon with superheated steam and then with oxygen.

6. The process of forming chrome green pigment which comprises treating micaceous laminated chromic chloride mixed with finely divided carbon with steam at 300° to 450° C. and then with oxygen at a temperature which will oxidize the carbon.

7. The process of forming chrome green pigment which comprises treating micaceous laminated chromic chloride with steam at 300° to 450° C.

In testimony whereof I affix my signature.

FRANK S. LOW.